(12) United States Patent
Suzuki et al.

(10) Patent No.: US 7,370,149 B2
(45) Date of Patent: *May 6, 2008

(54) CONNECTION SUPPORT METHOD FOR DISK ARRAY DEVICE

(75) Inventors: Katsuyoshi Suzuki, Odawara (JP); Masanori Hori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/305,034

(22) Filed: Dec. 19, 2005

(65) Prior Publication Data

US 2006/0095667 A1    May 4, 2006

Related U.S. Application Data

(63) Continuation of application No. 10/791,761, filed on Mar. 4, 2004, now Pat. No. 7,039,752.

(30) Foreign Application Priority Data

Dec. 17, 2003    (JP)    ............... 2003-419087

(51) Int. Cl.
   *G06F 13/00*    (2006.01)
(52) U.S. Cl. .................. 711/114; 714/25; 710/104
(58) Field of Classification Search ............ 439/928.1; 711/114; 714/25; 710/104
   See application file for complete search history.

(56) References Cited

U.S. PATENT DOCUMENTS

| | | | |
|---|---|---|---|
| 5,448,675 A | 9/1995 | Leone et al. | |
| 6,076,142 A | 6/2000 | Corrington et al. | |
| 6,285,293 B1 | 9/2001 | German et al. | |
| 6,493,498 B1 | 12/2002 | Colombo et al. | |
| 6,658,191 B2 | 12/2003 | German et al. | |
| 6,747,874 B2 | 6/2004 | McKinnon et al. | |
| 6,784,802 B1 | 8/2004 | Stanescu | |
| 6,809,505 B2* | 10/2004 | Peeke et al. ................. | 324/66 |
| 2002/0161474 A1 | 10/2002 | Dimitri et al. | |
| 2002/0162034 A1 | 10/2002 | Dimitri et al. | |
| 2003/0018756 A1* | 1/2003 | Nguyen et al. ............. | 709/220 |
| 2005/0111491 A1* | 5/2005 | Caveney ..................... | 370/475 |
| 2005/0120267 A1* | 6/2005 | Burton et al. ................ | 714/13 |
| 2005/0193059 A1* | 9/2005 | Dellacona ................... | 709/203 |
| 2005/0193359 A1 | 9/2005 | Dellacona ................... | 709/203 |

FOREIGN PATENT DOCUMENTS

JP    09330184    12/1997

* cited by examiner

*Primary Examiner*—Donald Sparks
*Assistant Examiner*—Jared I Rutz
(74) *Attorney, Agent, or Firm*—Mattingly, Stanger, P.C. Malur & Brundidge, P.C.

(57)    ABSTRACT

Apparatus to navigate connection among a controller housing and disk device housings which constitute a storage device. The controller housing, the disk device housings, and the like are stored in a storage device housing and are connected by ENC cables according to a typical connection method as preparation. A connection information file, which defines a connection state among respective connectors, is inputted to the controller housing. A controller lights or blinks LEDs of connectors, to which the ENC cables should be connected based on the connection information file, in a connection order. The controller navigates connection by sequentially lighting the LEDs of the connectors, which should be connected, in this way.

14 Claims, 16 Drawing Sheets

CONNECTION SUPPORT METHOD FOR DISK ARRAY DEVICE

CROSS-REFERENCES TO RELATED APPLICATIONS

The present application is a continuation of application Ser. No. 10/791,761, filed Mar. 4, 2004 now U.S. Pat. No. 7,039,752, which is related to and claims priority from Japanese Patent Application No. 2003-419087, filed on Dec. 17, 2003, the entire disclosure of which is incorporated herein by reference.

BACKGROUND OF THE INVENTION

The present invention relates to a support method of supporting cable connection between a controller housing (or unit), which is provided in a disk array device, and plural disk device housings (or units).

Plural disk devices are provided in a disk array device. A predetermined number of disk devices among these disk devices are stored in each of disk device housings. In disk array device housing, a controller housing, which contains a controller, and plural disk device housing are stored and connected by a fiber channel each other (see JP-A-9-330184).

Input ports and output ports for connecting cables of the fiber channel are provided in the disk device housings. The fiber channel is connected in loop using these ports. Conventionally, a connection method of forming two loops (hereinafter referred to as "two loop") has been mainly used such that the plural disk devices can be accessed in parallel.

FIG. 1 is an explanatory diagram showing a backend connection state of a controller housing CTL and disk device housings DISK. In this example, the controller housing CTL has two backend loops (FC-LA loops) which consist of two loops of a loop LP#0 and a loop LP#1. For each of the loops, the controller housing CTL and the disk device housings DISK are connected serially forming loops with cables EC, which are called ENC cables, connecting the housings.

FIG. 2 is an explanatory diagram showing an actual state of connection between disk device housings. In an example of this figure, two ENC units exist in one disk device housing DISK. PATHs 0 and 1 on a lower disk device housing OUT side and PATHs 0 and 1 on an upper disk device housing IN side are connected by ENC cables EC. In this example, in order to prevent misconnection of the PATHs 0 and 1, connectors are colored in unique colors (milky white and yellow). White circles in the figure indicate milky white and black circles indicate yellow. In addition, colored tags or the like are also attached to connector terminals to prevent misconnection in the same manner. In such a method, costs for attaching tags to connector cables and coloring the connector cables are incurred.

In a disk array device, the number of disk device housings tends to increase according to a demand for increased capacity or the like. In addition, it is attempted to increase the number of disk devices, which are accessible in parallel, and to improve a failure resistance property. As a result, it is attempted to perform connection of fiber channels, for example, by increasing the number of loops so as to form four loops (hereinafter referred to as "four loops") or adopting a dual path which provides plural controllers to make it possible to access the disk device housings from both directions. Due to these tendencies, that is, the increase in the number of loops and the dual path, the connection of cables in the disk array device tends to be complicated and easily causes misconnection. When misconnection occurs, the disk array device does not operate normally due to a cause such as inconsistency in a combination of disk devices constituting an FC-AL loop, which results in adverse effects such as deletion of stored data by mistake.

As a method of controlling the misconnection, as illustrated in FIG. 2, it is possible to adopt a method of color-coding cables and also coloring connectors of disk device housings and a controller housing to make it easy to recognize locations to which the cables of the respective colors are connected. However, this method has a disadvantage in that the method can only cope with a standardized connection method considered in advance and a disadvantage in that, when a connection method is complicated, the color-coding includes a large number of colors, and excess costs and labor are required for preparation of cables and the like.

SUMMARY OF THE INVENTION

The invention has been devised in order to solve such problems, and it is an object of the invention to provide a technique which can control misconnection of cables and cope with various connection methods in a disk array device.

The invention is applied to a disk array device which stores a controller housing and plural disk device housings in a disk array device housing. The disk device housings incorporate plural disk devices and have plural connectors for connecting cables for a fiber channel and plural lighting units (or parts) corresponding to the respective connectors, for example LEDs. The controller housing incorporates a controller for controlling reading and writing of data with respect to the disk devices. The controller of the invention controls lighting states of the lighting units in accordance with a connection order of the cables to thereby navigate connection between the respective disk device housings and the controller housing. According to the invention, misconnection of the cables can be controlled by this navigation.

In the invention, the lighting states are controlled in accordance with a connection order as described above. As an example, a method of, after a cable is connected to a connector, lighting a lighting unit which should be connected next can be adopted. For a cable connected at one end, a lighting state may be changed at the time when a connecting location of the other end is indicated and the time when a connecting location of a new cable is indicated. Since lighting states are controlled in accordance with a connection order, in the invention, only a lighting state of a connector to be connected is different from lighting states of other connectors. Therefore, appropriate navigation can be realized only by lighting control without necessity of color-coding for cables and connectors. As a result, there is an advantage in that navigation, which is capable of flexibly coping with various connection methods, can be realized. In the invention, navigation by voices may be performed instead of the lighting control or together with the lighting control. In the case in which voices are used, for example, a method of reading housing numbers and connector numbers in accordance with a connection order can be adopted. As an example, there is navigation emitting voices "please connect a Path0 ENC connector of a housing on which an LED is lit and a Path0 connector of a housing on which an LED is lit". However, according to the lighting control, there is an advantage in that a connecting location can be recognized more easily and surely than the navigation by voices.

In the invention, although the lighting units can be provided in various portions, it is preferable to provide the lighting units in a fixed relative positional relation with respect to the respective connectors. For example, the fixed relative positional relation is a relative positional relation such as an upper part and a lower part of the respective connectors. Consequently, it becomes possible to intuitively recognize a connector to which a cable should be connected.

A control signal from a controller for performing the lighting control can be communicated through various paths. For example, the controller housing and the disk device housings may include a LAN port, respectively, for the purpose of failure monitoring or the like. In such a disk array device, it is possible that all the controller housing and the disk device housings are connected by a LAN cable before connecting the fiber channel cable to perform communication through this LAN cable.

In addition, as another method, it is also possible that all the controller housing and the disk device housings are temporarily connected serially by the fiber channel cable, and the controller performs communication via this connected fiber channel cable. Since the serial connection is relatively simple, there is less likelihood of misconnection. In addition, in the above-described form, since the serial connection is only used for communication control, it is less likely that the serial connection causes a failure. In this form, temporary connection, which has become unnecessary in a course of connecting cables according to navigation of the controller, only has to be removed sequentially or collectively. The controller may perform the lighting control so as to instruct removal of the temporary connection which has become unnecessary. For example, both connection and removal of the connection can be instructed by changing a lighting method for the connection and the removal, for example, a lighting unit is lit in the case in which the connection is instructed and the lighting unit is blinked in the case in which the removal is instructed.

In the invention, a button or the like may be provided in the controller itself such that information for defining a connection order can be set directly. In addition, a connection information file defining a connection order may be read by the controller from a predetermined external apparatus, for example, a management apparatus connected to the disk array device via a network. Consequently, there is an advantage in that setting of connection information is facilitated.

In order to reduce a load on a user caused by setting a connection order, an external apparatus may be able to generate a connection information file automatically on the basis of information specifying the number of disk device housings, the number of disk devices to be incorporated in the respective disk device housings, and a structural specifications of a RAID. In addition, these pieces of information may be able to be designated by a GUI (Graphical User Interface).

In the invention, the controller may specify the respective connectors according to, for example, a combination of housing information, which specifies the disk device housings, and path information, which specifies the respective connectors in the disk device housings. Consequently, it becomes possible to easily specify the respective connectors regardless of the number of disk device housings. In order to specify the connectors, it is preferable that the controller acquires the housing information and the path information prior to the lighting control.

The controller may be adapted to detect abnormality in a connection state of a connected connector in a connection process. The abnormality in a connection state includes misconnection between connectors and defective connection to a connector. The controller can perform this abnormality detection by judging whether or not exchange of signals is performed properly between connectors which should be connected.

The invention may be applied to a dual controller disk array device which includes plural controllers. In this constitution, respective connectors are connected to any one of the controllers, and the respective controllers perform control of a lighting state individually. In this case, it is preferable that the respective controllers stagger output timing of lighting control signals each other in order to avoid confusion at the time of cable connection.

The invention may be constituted as a connection support method of navigating a connection order in a disk array device other than the above-mentioned constitution as the disk array device. In addition, the invention may be constituted as a computer program for realizing this connection support method with a computer and as a computer readable recording medium having such a computer program recorded therein. Here, as the recording medium, computer readable various media such as a flexible disk, a CD-ROM, a magneto-optical disk, an IC card, a ROM cartridge, a punch card, a print on which codes such as bar codes are printed, an internal storage device (memory such as a RAM or a ROM) of a computer, and an external storage device can be used.

DESCRIPTION OF THE PREFERRED EMBODIMENTS

Figure 3:
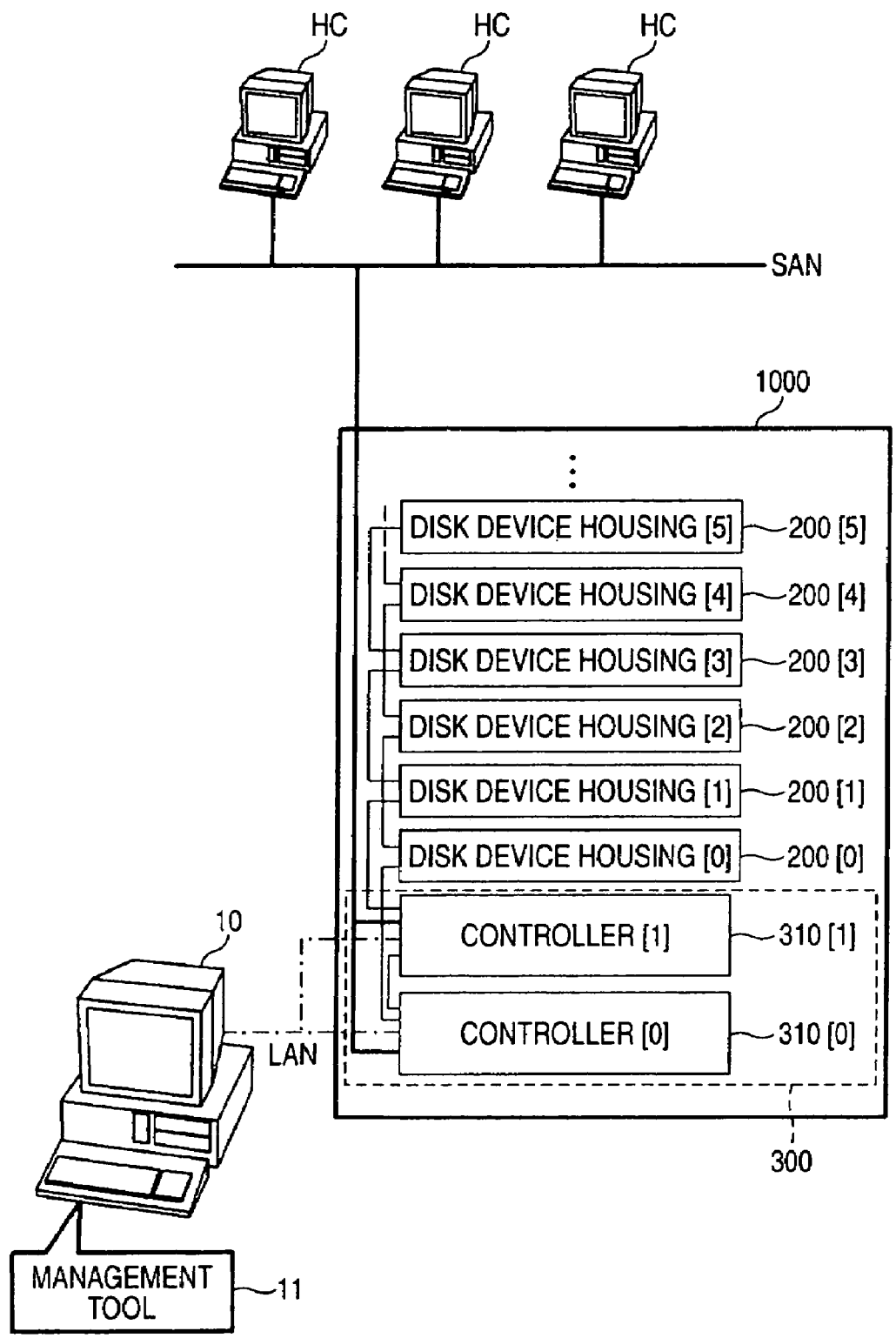
FIG. 3 is an explanatory diagram showing a schematic structure of an information processing system as an embodiment.

Embodiments of the invention will be described in an order described below.
A. System structure
B. Connection navigating function
C. Modifications A. System Structure FIG. 3 is an explanatory diagram showing a schematic structure of an information processing system as an embodiment. In the information processing system, a storage device 1000 and host computers HC are connected by a SAN (Storage Area Network). The respective computers HC can access the storage device 1000 to realize various kinds of information processing. A management apparatus 10 is connected to a local area network LAN. A general-purpose personal computer having a network communication function or the like can be used as the management apparatus 10. A management tool 11, that is, an application program for setting an operation of the storage device 1000 and monitoring an operation state of the storage device 1000 is installed in the management apparatus 10.

In the storage device 1000, plural disk device housings 200 and a controller housing 300 are stored in a storage device housing (hereinafter also referred to as "rack"). As described later, the disk device housing 200 stores a large number of disk devices (hereinafter also referred to as "HDDs") in the inside thereof. As the disk devices, a general-purpose disk of 3.5 inches adopted in a personal computer or the like can be used. The controller housing 300 stores controllers 310 for controlling reading and writing of data with respect to the disk devices. In this embodiment, a dual controller storing two controllers 310 is applied. The controllers 310 exchange data with the host computers HC via the SAN and exchange data with the management apparatus 10 via the LAN. The controller housing 300 and the respective disk device housings 200 are connected to each other on the back side thereof by cables for fiber channels (hereinafter referred to as "ENC cable").

Figure 4:
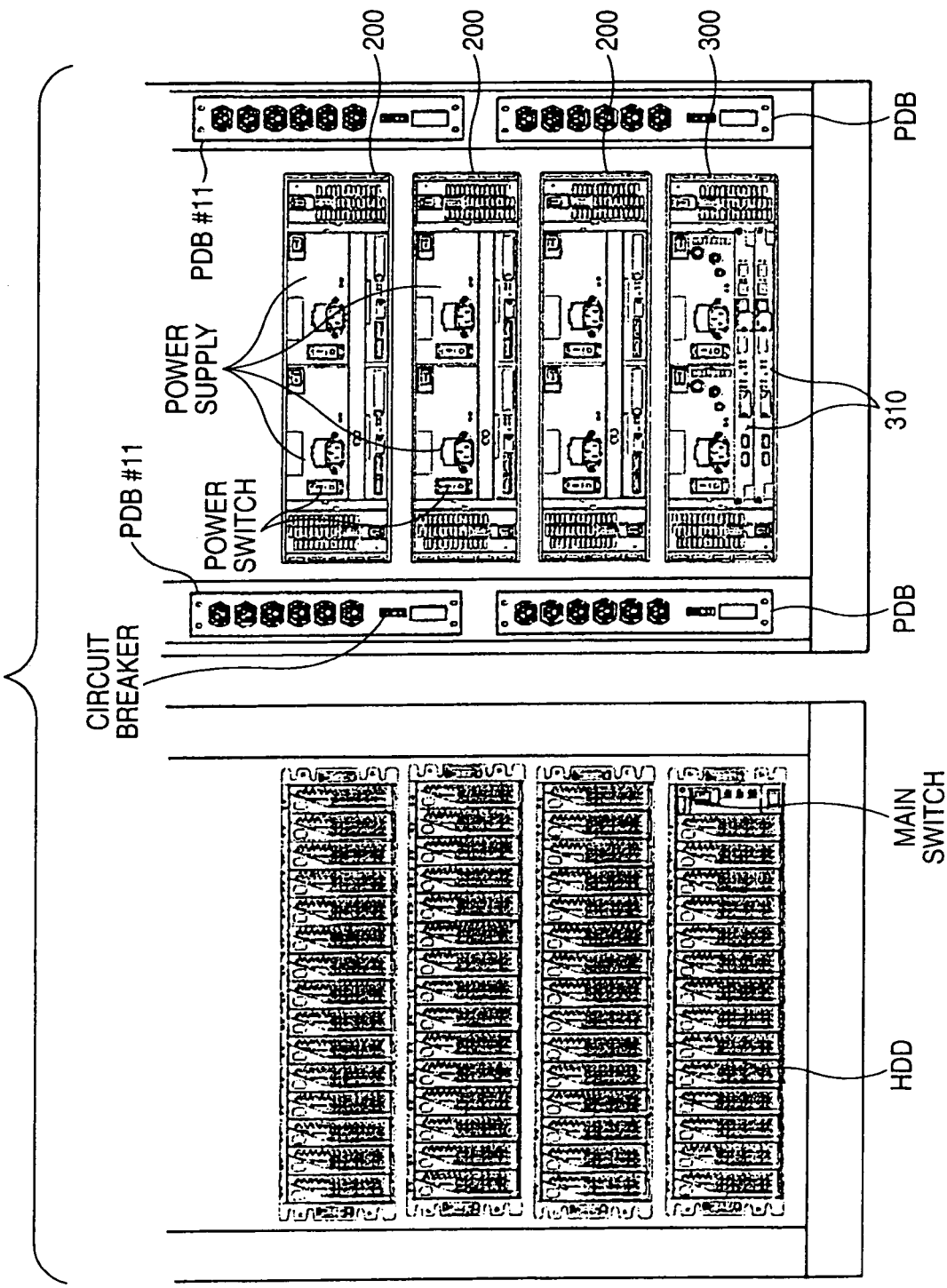
FIG. 4 is an explanatory diagram showing an embodiment of implementation of a disk array device which is mounted to a rack.

FIG. 4 is an explanatory diagram showing an embodiment of implementation of a disk array device mounted to a rack. The left side of the figure indicates a state viewed from the front, and it can be seen that HDDs are mounted. The right side of the figure is a rear view, in which a power cable, an ENC cable, a LAN, and the like are not implemented. The controller housing 300 is stored in the bottom part, in the lower center of which the controllers 310 are implemented in two stages. A power supply is stored above and fans are provided on the left and right of the controller 310. The disk device housings 200 are stored above the controller housing 300. ENC boards are implemented symmetrically in the lower parts of the disk device housings 200. Connectors on the ENC boards and connectors on a controller board are connected by FC cables. Usually, power is supplied to the disk array device from PDBs through a power cable and a power supply device. This embodiment is executed in a state in which supply of power is carried out first.

Figure 5:
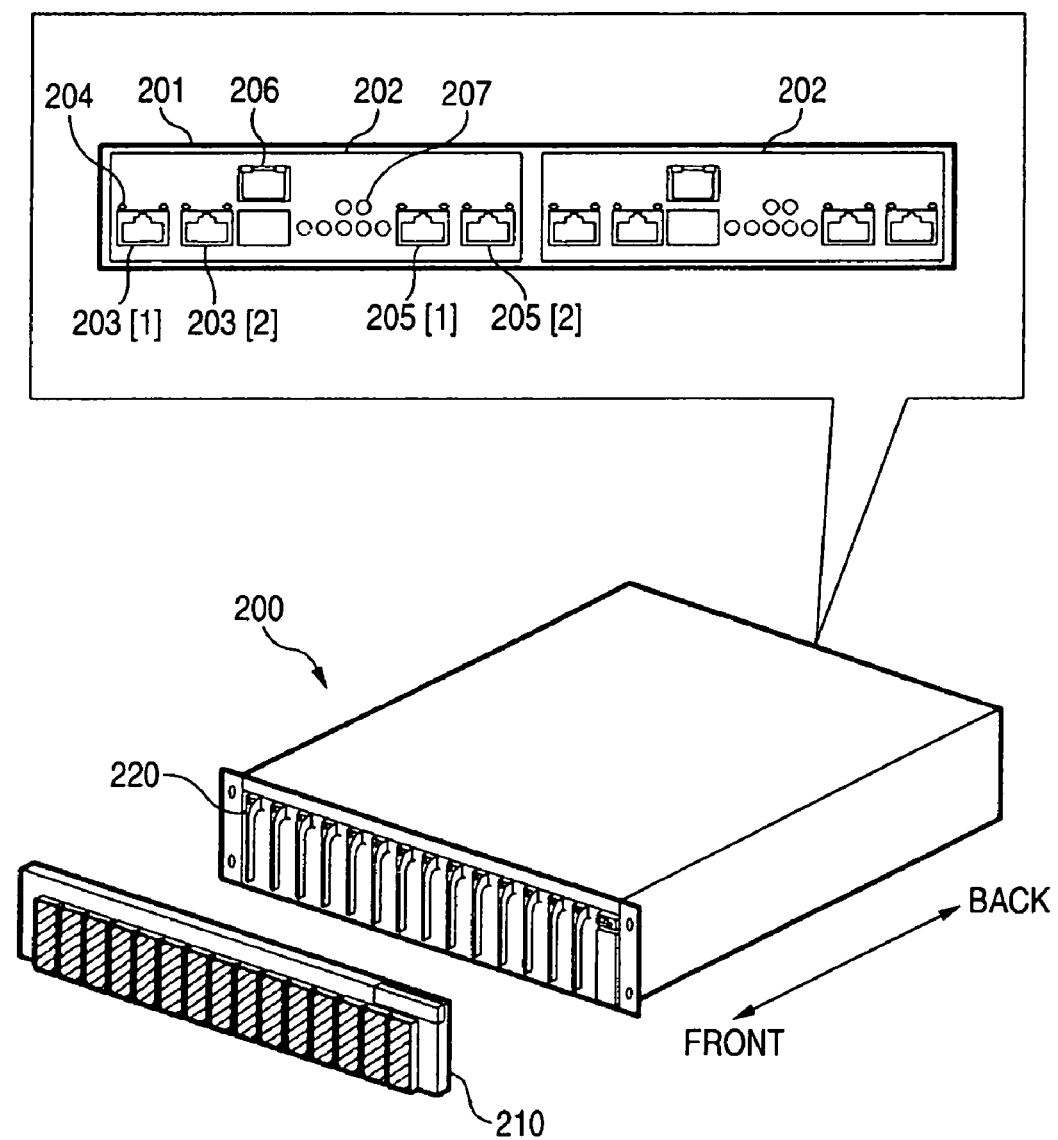
FIG. 5 is a perspective view of a disk device housing 200.

FIG. 5 is a perspective view of the disk device housing 200. A front bezel 210 is attached to the front of the disk device housing 200, and plural disk devices 220 are arranged in the inside thereof. It is possible to mount, detach, and replace the respective disk devices 220 by pulling it out to the front. In the upper part of the figure, a state of a connection panel on the rear side is shown. The disk device housing 200 includes a circuit for connecting respective housings with the ENC cable, and this circuit is connected to IN side connectors 203 and OUT side connectors 205. In this embodiment, two IN side connectors 203 and two OUT side connectors 205 are provided in the respective ENC unit such that the disk devices are accessible from two controllers. In addition, the respective disk devices are accessible from two paths. Therefore, in the disk device housing 200, two ENC units 202 are mounted, and total four IN side connectors 203 and OUT side connectors 205, that is, connectors corresponding to four paths (hereinafter also referred to as "FC-AL loops") are provided. LEDs 204 are provided above the respective connectors. However, in order to avoid complication of the figure, reference numeral for the LEDs 204 is affixed only for a connector 203[1]. A LAN connector 206 for connecting the LAN cable and LEDs 207 for indicating a state of the ENC may be provided in the ENC unit 202. In a disk device housing which is not provided with the LEDs 204, the LEDs 207 may be associated with the LEDs 204 by changing a lighting method thereof.

Figure 6:
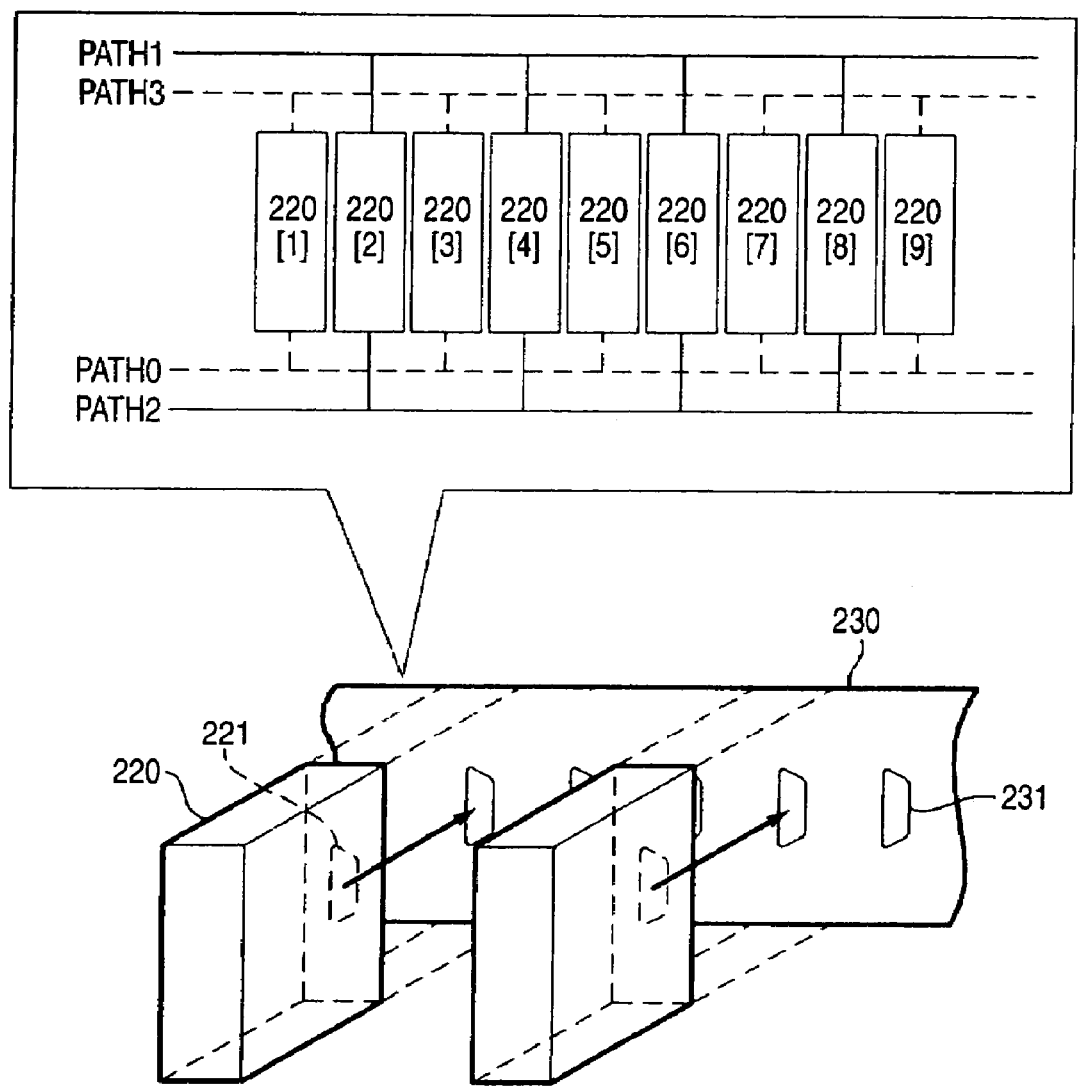
FIG. 6 is an explanatory diagram schematically showing an internal structure of the disk device housing 200.

FIG. 6 is an explanatory diagram schematically showing an internal structure of the disk device housing 200. In this embodiment, the disk devices 220 have an interface for fiber channels. The disk devices 220 are formed as a dual port, and reading and writing with respect to the disk devices 220 are possible from two paths. As shown in the center of the figure, a backboard 230, on which connectors for mounting the disk devices 220 are arranged, is attached to the back of the disk device housing 200. When the respective disk devices 220 are inserted from the front of the disk device housing 200 in a drawer like manner, the connectors 221 of the disk devices 200 are attached to the connectors 231 of the backboard 230.

Then, the respective disk devices 220 are connected to four paths Path 0 to Path 3 of the disk device housing 200. The Path 0 and the Path 1 are primary paths to be ordinary access paths from an active controller. The Path 2 and the Path 3 are alternative paths to be access paths from the other controller. In this way, the respective disk devices 220 are constituted to be accessible from the two controllers. In this embodiment, the disk devices 220 to be connected to the Paths 0 and 3 and the disk devices 220 to be connected to the Paths 1 and 2 are arranged alternately. The illustrated structure is only an example, and the number of paths inside the disk device housing 200 and association with the path and the disk devices 220 can take various forms.

Figure 7:
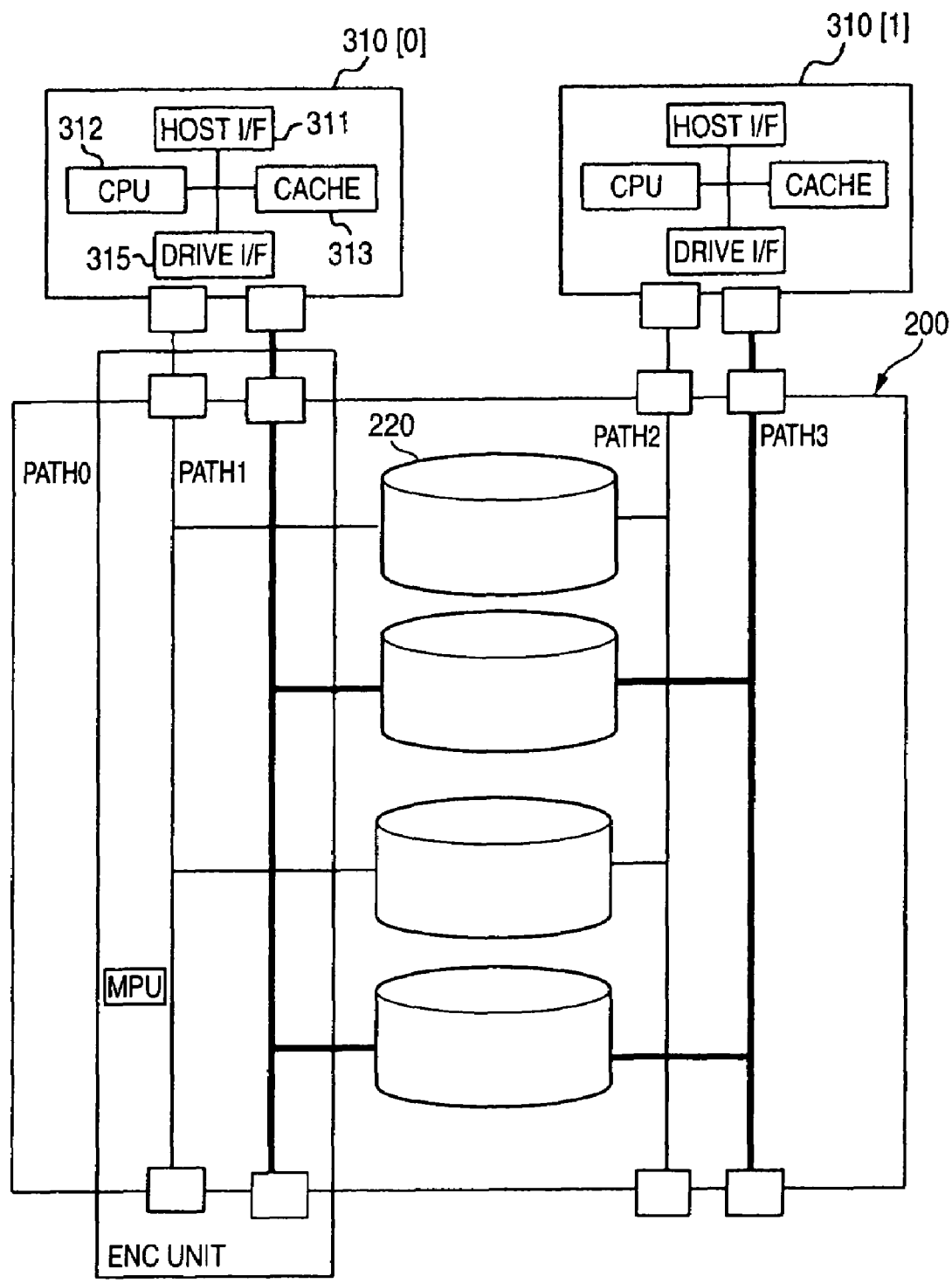
FIG. 7 is an explanatory diagram schematically showing an internal structure of a storage device 1000.

FIG. 7 is an explanatory diagram schematically showing an internal structure of the storage device 1000. FIG. 7 shows an internal structure of the controller 310 incorporated in the controller housing 300 and an internal structure of the disk device housing 200. The controller 310 includes a CPU 312, memories such as a RAM and a ROM, and the like in the inside thereof. The controller 310 includes a host I/F 311, which is a communication interface with the host computer HC, and a drive I/F 315, which is a communication interface with the disk device housing 200. The host I/F 311 provides a communication function complying with a fiber channel standard. The drive I/F 315 provides a communication function of an SCSI standard or the fiber channel standard. These interfaces may be provided for plural ports. The memories include a cache memory 313, in which data to be written in and data to be read out from the disk device 220 are stored, and a shared memory for storing various kinds of software for control. In this embodiment, the above-mentioned four loops Path 0 to Path 3 are formed by two controllers 310[0] and 310[1]. In the disk device housing 200, as described earlier, the plural disk devices 220 are connected to two FC-AL loops, respectively.

Figure 1:
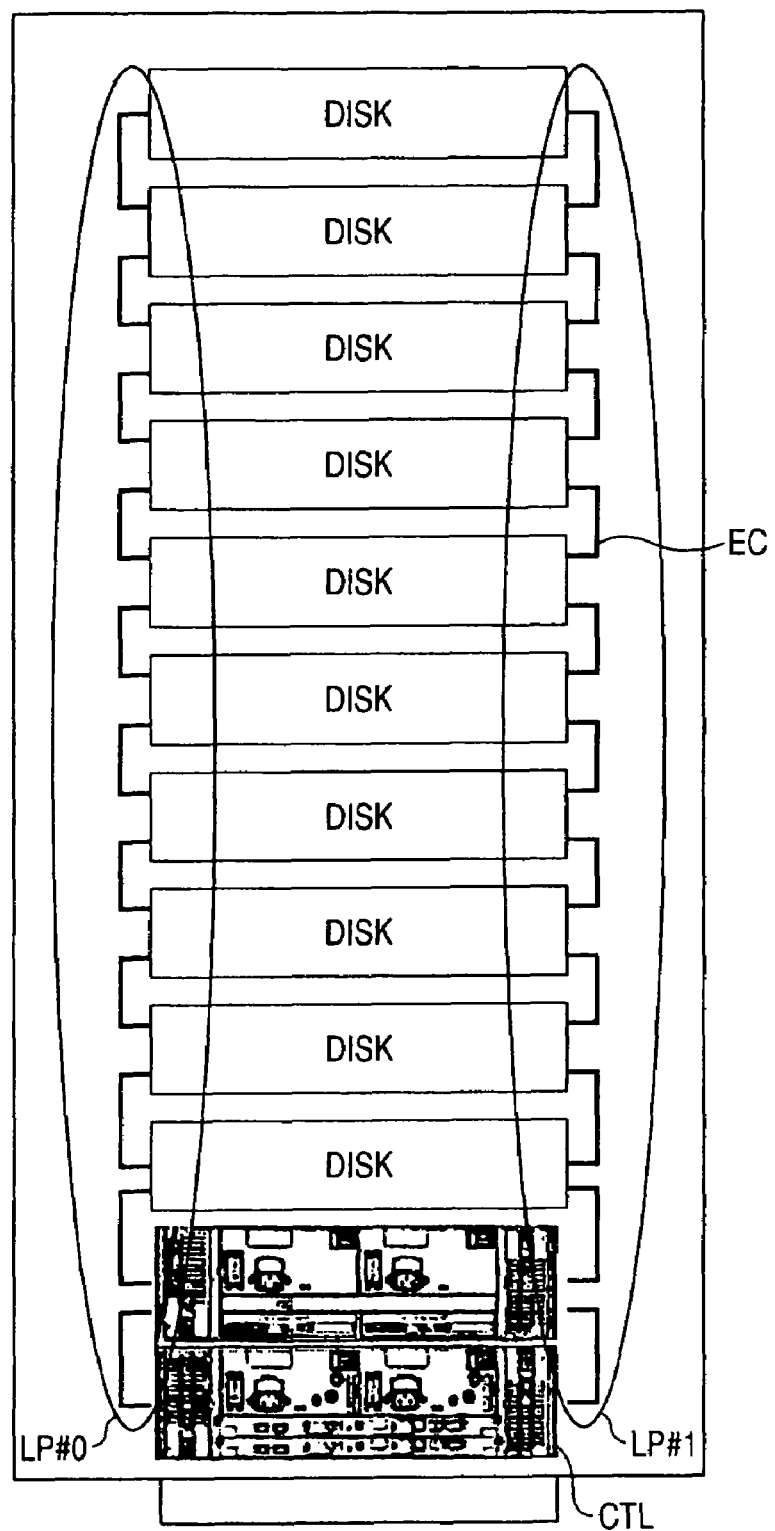
FIG. 1 is an explanatory diagram showing a backend connection state of controller housings CTL and disk device housings DISK.
Figure 2:
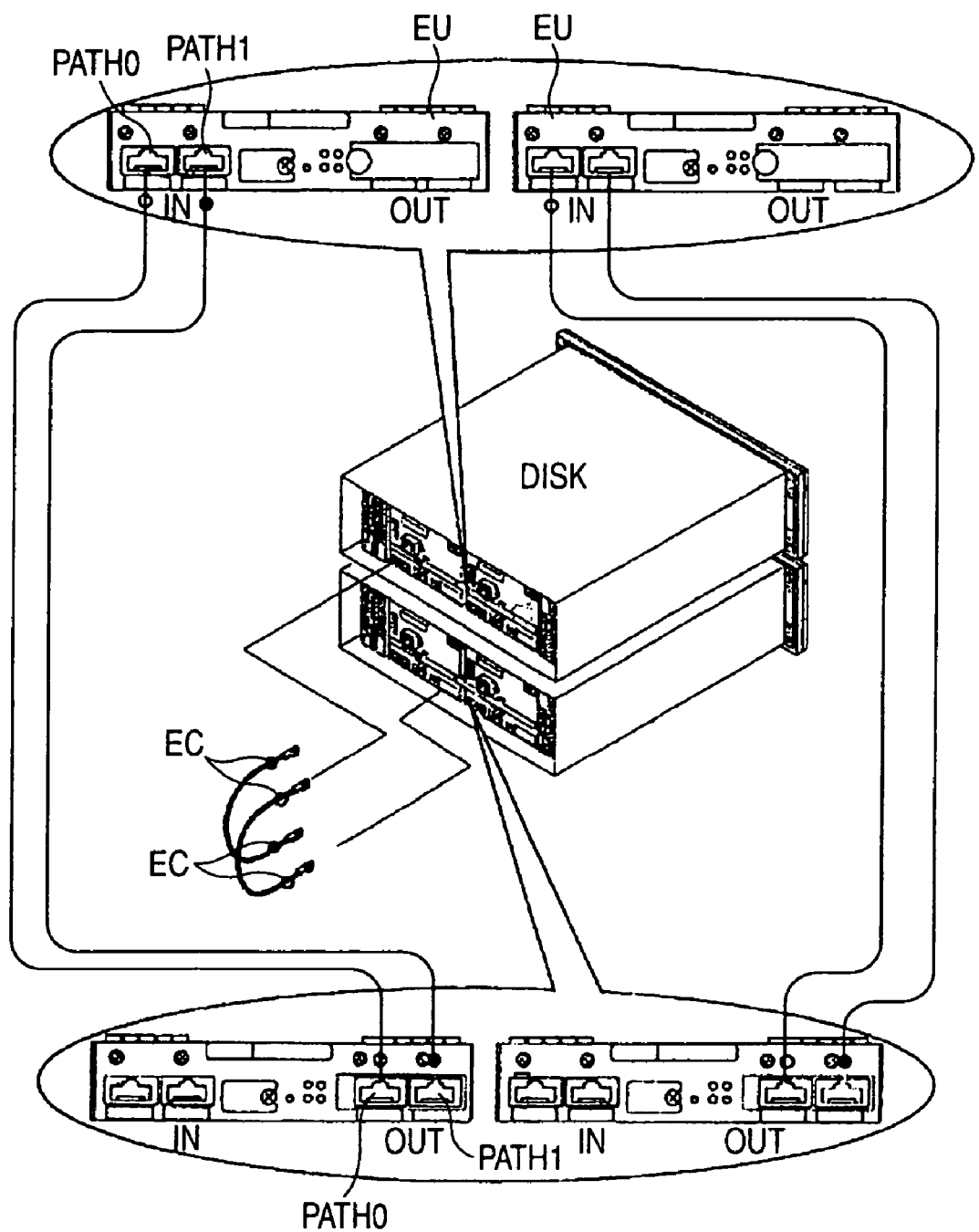
FIG. 2 is an explanatory diagram showing an actual state of connection between disk device housings.
Figure 8:
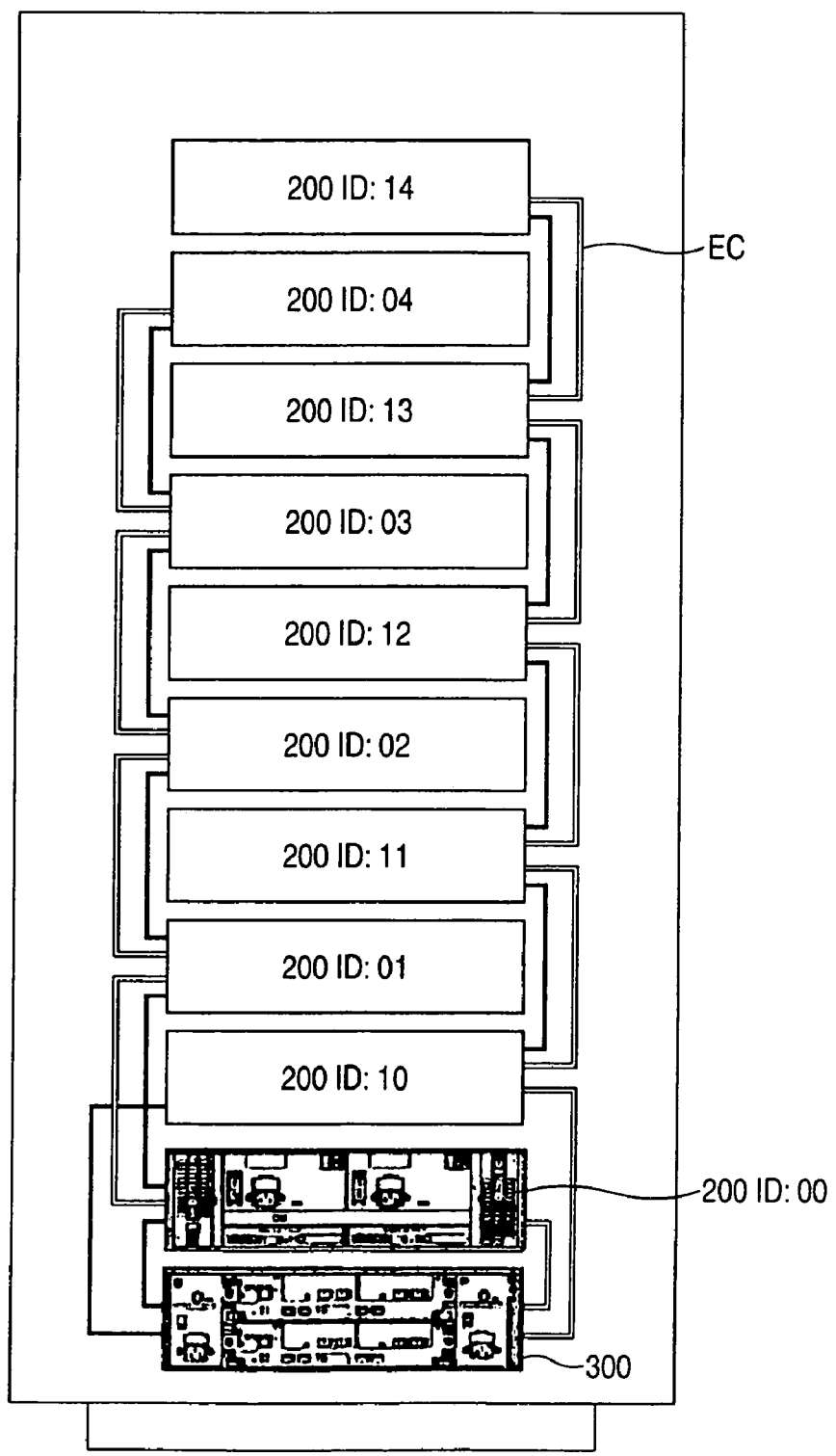
FIG. 8 is an explanatory diagram schematically showing a state in which a controller housing 300 and disk device housings 200 of a disk array device are mounted to a rack.
Figure 9:
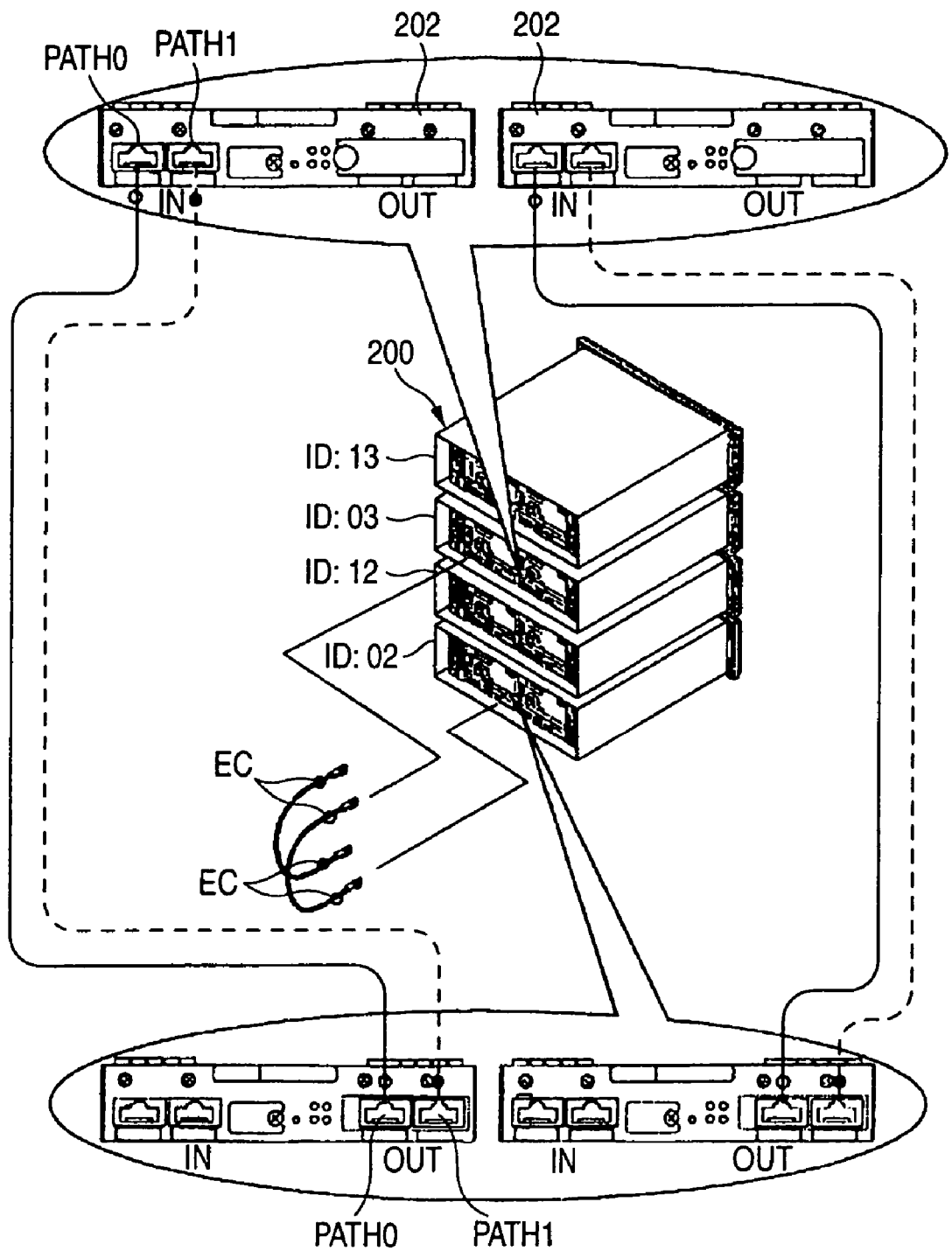
FIG. 9 is an explanatory diagram in which connection of the disk device housings of FIG. 8 are represented in a factual diagram.

B. Connection Navigating Function:

FIG. 8 is an explanatory diagram schematically showing a state in which the controller housing 300 and the disk device housings 200 of the disk array device are implemented in a rack. Unlike FIG. 1, this embodiment is an example of a controller having four loops/devices in a backend. Disk device housing IDs are given to the disk device housings 200. There are two kinds of IDs: IDs of 1 line and IDs of 0 line. This is for facilitating visual recognition of identifications of loops. Since the respective disk device housings only have to be simply recognized, simple serial numbers of the disk device housings may be acceptable. The controller housing 300 includes four backend loops, and two backend loops are connected to the disk device housings 200 with the ID of 00 and the ID of 01, respectively. In order to form a loop for each line, the disk device housings 200 of the respective lines are implemented every other stage in the rack, and are connected every other stage. FIG. 9 is an explanatory diagram in which connection of the disk device housings of FIG. 8 are represented in a factual diagram.

Figure 10:
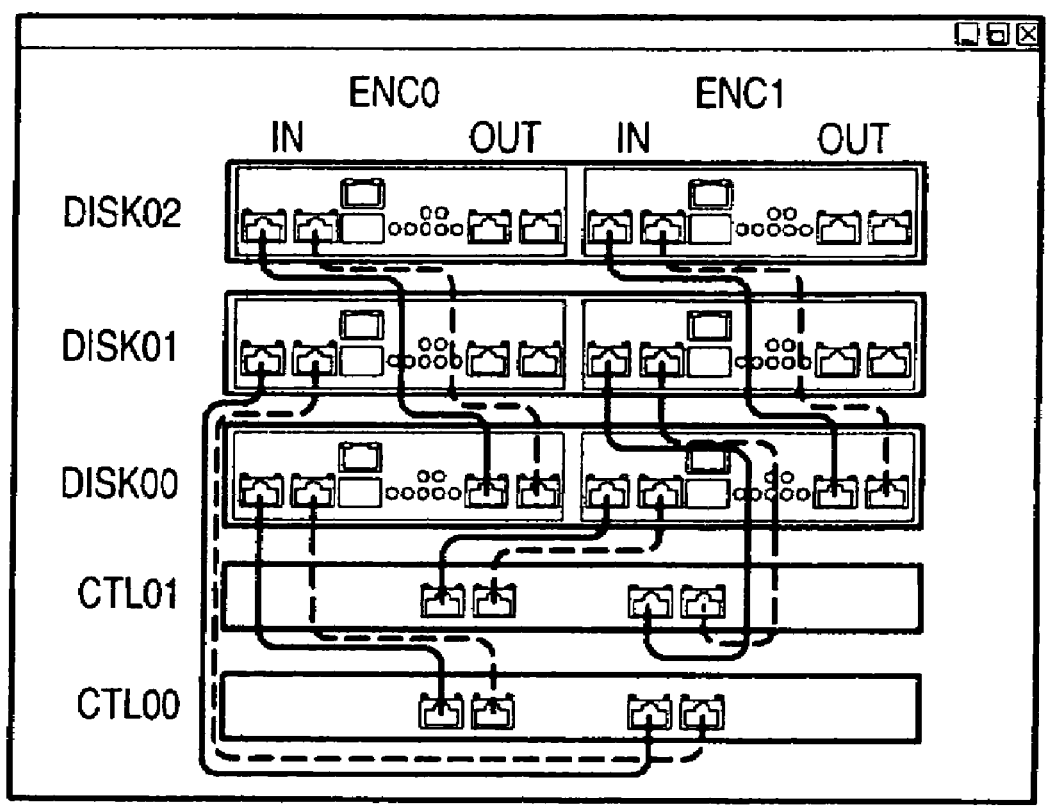
FIG. 10 is an explanatory diagram showing connection of port images of controller housings and disk device housings.

FIG. 10 is an explanatory diagram showing connection of port images of controller housings and disk device housings. Such a figure can be displayed on a display in a GUI of a management tool. For example, actual connection information is simultaneously displayed in parallel with connection, whereby a state of connection work can be monitored on a real time basis and, even if misconnection occurs, the misconnection can be found immediately. If misconnection occurs, it is also possible to inform a manager of the connection by, for example, blinking light.

Thick curve in the figure represent ENC cables. The lines are divided into solid lines and broken lines in order to avoid complication of display, and there is no substantial difference between the solid lines and the broken lines. With such display, it becomes possible for a user to confirm before connection, on a screen, whether or not a connection state is realized according to specifications. For example, in the case in which the respective housings are stacked in order as shown in the figure, at the time of connection of the four loops, the alternate housings such as the controller CTL 01 and the disk device housing DISK 01 are usually connected. If such a characteristic is known, it becomes possible to determine propriety of a connection state relatively easily according to the display of FIG. 10.

Figure 11:
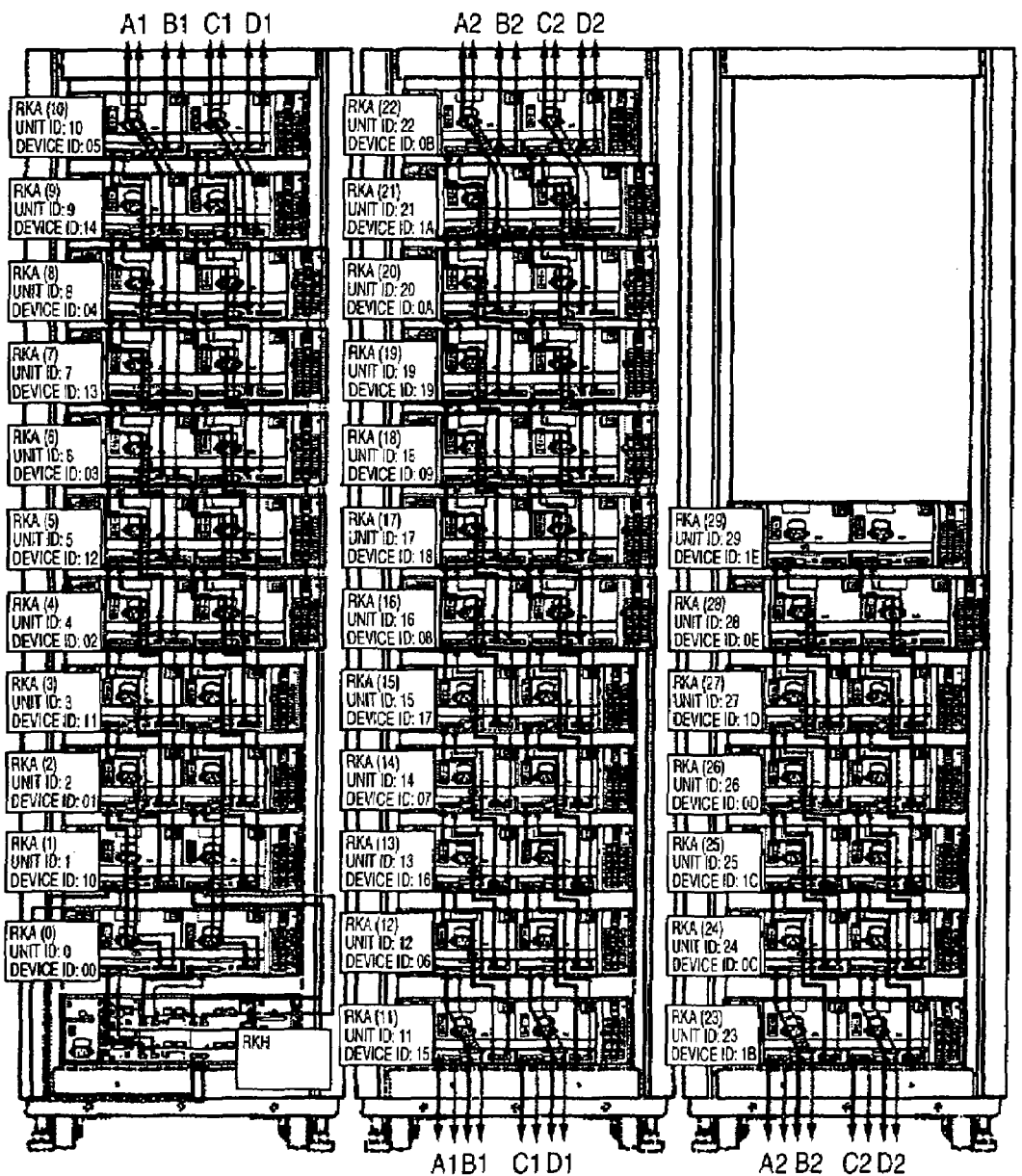
FIG. 11 is a connection diagram in the case in which housings are mounted to three racks and connected.

FIG. 11 is a connection diagram in the case in which housings are mounted to three racks and connected. RKH indicates a controller housing, and RKA indicates disk device housings. The respective racks are connected in parts represented by respective alphabets A, B, C and D.

As shown in FIG. 5, for example, the LEDs indicating an operation state of the ENCs are attached to the ENC connectors. It is possible to inform a serviceperson of a location of a connector to which a cable is connected by blinking and lighting the LEDs. In the case in which there is no LED attached to the connectors, it is also possible to associate the LEDs located in the center of the figure with the connectors by allocating states of the connectors to the LEDs. If the existing LEDs are diverted, costs can be reduced. In addition, in order to further improve maintainability, it is within an applicable range to provide dedicated LEDs or, for example, attach a navigating function to perform navigation with voices "please connect a Path0 ENC connector of a housing on which an LED is lit and a Path0 connector of a housing on which an LED is lit". In this embodiment, misconnection can be controlled by these navigating functions, for example, even in complicated connection as shown in FIG. 11.

Some ENC units include a LAN connector. In order to recognize a housing to which a cable is not connected, the ENC units use a LAN as means for this purpose. Since the ENC units are used for recognition of a housing, the ENC units only have to hold a LAN by a unit of housing rather than by a unit of ENC unit.

Figure 12:
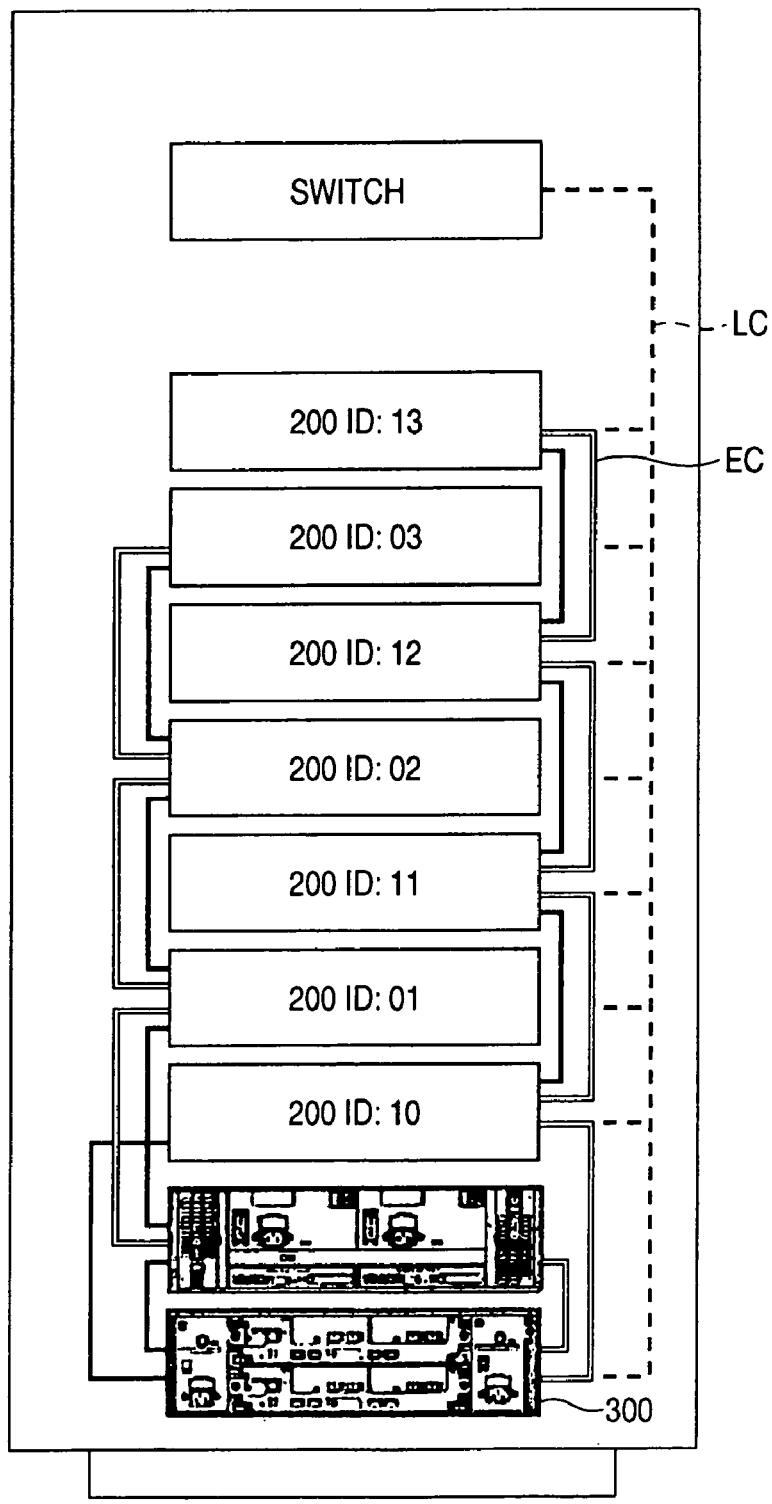
FIG. 12 is an explanatory diagram illustrating means for recognizing information of disk device housings which are not connected from an ENC cable.

FIG. 12 is an explanatory diagram illustrating means for recognizing information of disk device housings which are not connected from an ENC cable. As illustrated, in the case in which the respective disk device housings 200 include a LAN port, it becomes possible to recognize all the disk device housings from the controller housing 300 by connecting the controller housing 300 to the disk device housings 200 with the LAN cable LC first. As a method of recognizing the disk device housings 200, for example, it is also possible to connect all PATHs 1 of an ENC unit 1 serially with an ENC cable first to recognize the disk device housings 200. In this case, this connection which does not use a port is navigated and, at the point when all the disk device housings 200 have become recognizable by the connection, an instruction to remove the initial serial connection is issued, and remaining connections are navigated, whereby it becomes possible to recognize the disk device housings 200. The first navigation navigates a connection, which secures a path for recognizing all the disk device housings 200, first preferentially by one path.

Figure 13:
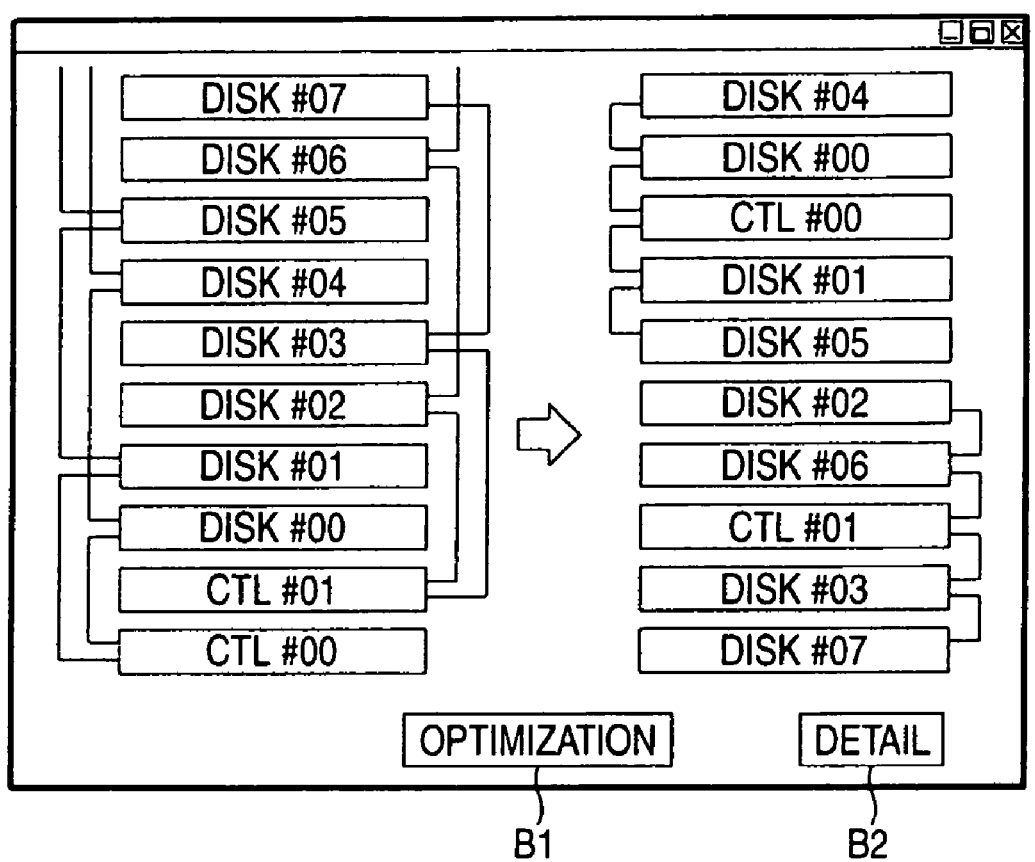
FIG. 13 is an explanatory diagram showing wiring among housings in the case in which two systems are mounted to a rack.

FIG. 13 is an explanatory diagram showing wiring among housings in the case in which two systems are mounted to a rack. FIG. 13 shows an example of an output screen in the management apparatus 10. The left side of the figure shows an example in which controller housings (CTL#00, CTL#01) are mounted at the bottom and disk device housings 200 (DISK#00, #01, etc.) are mounted on the controller housings, and the controller housings and the disk device housings 200 are connected. Connection looks complicated, and a long cable is also required. The right side of the figure shows an example in which implementation positions of the respective housings are changed. The controller housings (CTL#00, CTL#01) are arranged in the center of upper and lower two blocks and are also arranged for each loop in the upper and lower parts, whereby it is possible to simplify the connection and reduce the length of the cable. In this way, the management tool 11 (see FIG. 3) automatically carries out optimization of rack implementation on the basis of necessary several pieces of information such as a structure of actual devices to be mounted to the rack, the number of housings, and the like to reduce the length of the cable and simplify the connection.

For example, it is also possible that, in a state in which the state on the left is displayed, when a user presses an optimization button B1, the optimal arrangement on the right is displayed. The user can store the disk device housings 200 and the controller housing 300 in the storage device housing looking at this screen. In addition, it is also possible that the user presses a detail button B2, whereby the connection state shown in FIG. 10 is displayed.

Figure 14:
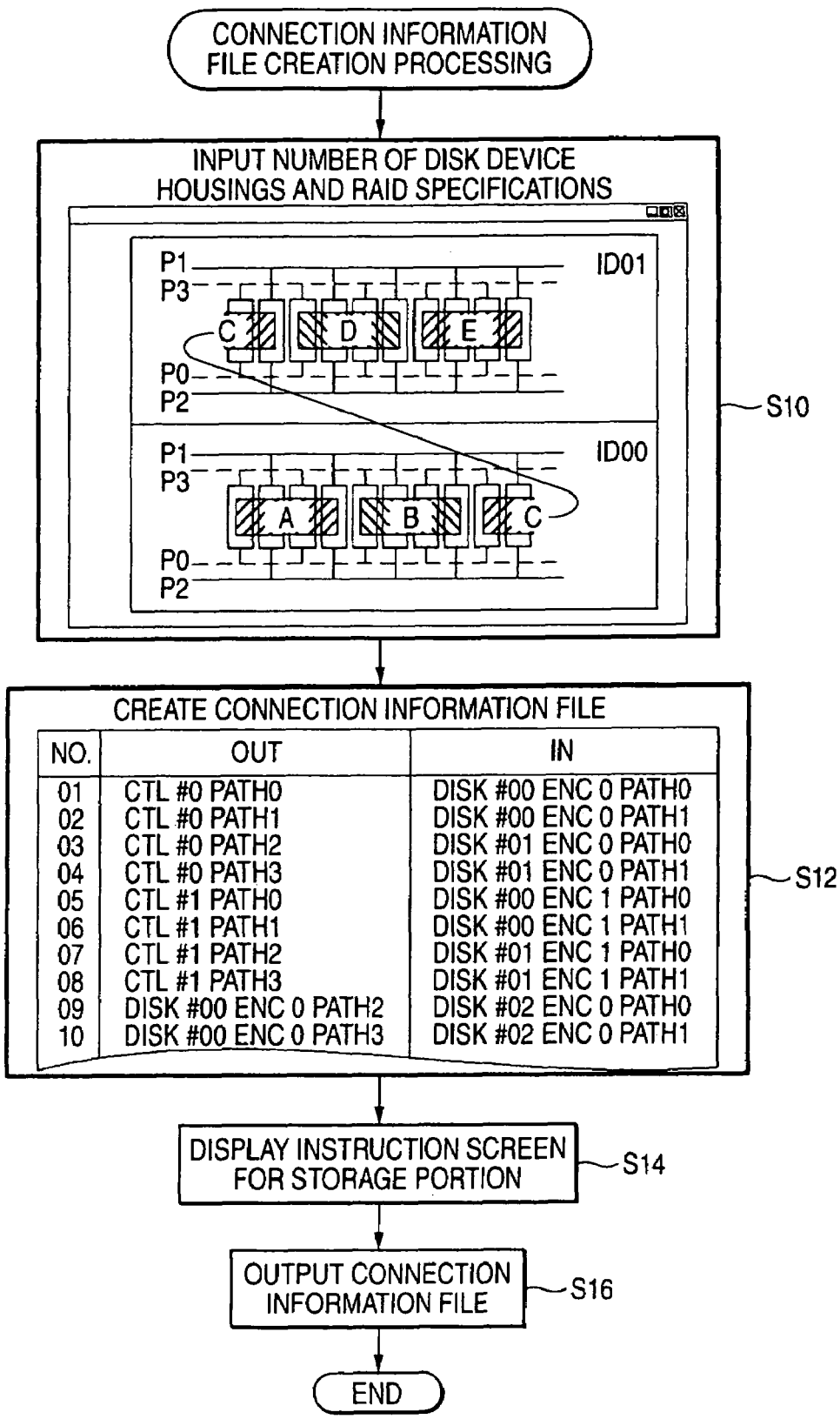
FIG. 14 is a flowchart of connection information file creation processing.

In order to realize the connection navigating function in the storage device 1000, the user creates a connection information file using the management tool 11. The connection information file is information which the controller housing 300 requires in order to realize connection navigation, that is, information defining a connection method between the respective disk device housings 200 and the controller housing 300. FIG. 14 is a flowchart of connection information file creation processing. This processing is one of functions provided by the management tool 11.

When this processing is started, the management tool 11 receives input by a user concerning the number of the disk device housings 200, specifications of a RAID, and the like (step S10). In the figure, an example of a GUI, which is displayed on the management apparatus 10 for this input, is also shown. When the user inputs the number of the disk device housings 200, the number of the disk devices 220 to be stored therein, the number of paths, and the like, the disk devices 220 and the paths are shown schematically according to this input. In the illustrated example, ID00 and ID01 indicate the disk device housings 200, squares in ID00 and ID01 indicate the disk devices 220, and lines of P0 to P3 indicate the paths. In this display, the user inputs the specification of a RAID by dragging a pointer. The figure shows an example of establishing a RAID 4 which handles four disk devices consisting of three striping disks and one parity disk as one set. In this example, five sets of A to E can be operated by the RAID 4.

For example, ten HDDs are stored in a disk device housing, and this disk device housing is constituted to be accessible from four PATHs. A RAID group constitute, for example, 3D+1P with an HDD 1 to an HDD 4. The next RAID group is constituted by an HDD 5 to an HDD 8, and the next RAID group is constituted by an HDD 9 to an HDD 12. The HDDs constituting the RAID groups are constituted by plural housings. The RAID group is constituted by adjacent HDDs in this way because, for instance, the four HDDs are accessible independently from the four PATHs and high-speed access is possible in this example. For example, if the RAID group is constituted by the HDDs 1, 5, 9 and 13, access is made from two PATHs, and performance decreases. In the case in which a RAID group is defined by a management tool of a general GUI, there are known many methods of selecting HDDs from an arrangement plan of HDDs as shown in the figure to define the RAID group. In the case in which a structure of HDDs is defined by a tool of a GUI, since disk device housings are often indicated by serial numbers, housings are actually mounted to a rack in many cases in accordance with the display. This is one of factors which make connection among the housings complicated. In the case in which priority is given to simplification of connection, it is possible to solve this problem by causing a GUI to display an actual state complying with the rack implementation.

Next, the management tool 11 creates a connection information file on the basis of input of the user (step S12). The connection information file is a file in which information defining a connection method between the respective disk device housings 200 and the controller housing 300 is stored. An example of the connection information file is shown in the figure. In this example, connectors for connecting ten ENC cables No. 1 to No. 10 are defined. For example, a first ENC cable is connected to an OUT side connector for Path 0 of a controller housing 300[0] (CTL #0) and an IN side connector for Path 0 of an ENC unit 202[0] (ENC 0) of the disk device housing 200[0] (DISK #00). The other cables are connected in the same manner. The respective connectors of the disk device housings 200 are specified by combinations of numbers of the housings, numbers of the ENC units 202, and the path numbers. By adopting such a method of specification, the respective connectors can be easily specified unconditionally even if the number of housings, the number of ENC units, or the number of paths changes.

The connection information file is generated automatically from information such as the number of mounted HDDs, a RAID constitution, and LU information by a tool which assembles a structure of a disk array device with a GUI. Alternatively, the connection information file may be generated by a designer manually. In the connection information file, for example, in addition to IDs for recognizing disk device housings, PATH numbers, unit numbers, and classifications of IN and OUT for recognizing connectors, additional information for verifying validity of connection may be added.

The management tool 11 displays an output screen for instruction of a storage portion on the basis of the connection information file set in this way (step S14) and, after obtaining confirmation of the user, outputs the connection information file to the controller 310 of the storage device 1000 via a local area network LAN (step S16). The management apparatus 10 can also adopt, for example, a method of controlling the controller housing 300 of the disk array device by communication through the LAN and navigating connection by sequentially lighting and blinking the LEDs or the like of the connectors of the housings to be connected according to control of a micro-program operating in the controller housing 300.

According to the information processing system of the embodiment described above, misconnection at the time of connection of the ENC cables can be controlled by the connection navigation. As a result, defective operation of the storage device 1000 due to misconnection can be controlled. The connection navigation in this embodiment is performed by the method of lighting the LEDs in accordance with a connection order, there is an advantage in that the connection navigation can be realized without the necessity of color-coding the LEDs, the connectors, the ENC cables, and the like.

C. Modifications:

(1) Verification method:

As an item to be verified for backend connection, other than connection locations of cables, the number of connections can be naturally cited as an example because there is limitation on drives which are connected to one FC-AL loop of backend. When the number of HDDs increased by one housing connection is added to the number of existing connected HDDs, if the total number of HDDs exceeds a limit value, an error is detected at this point. In the case in which a wiring drawing is wrong due to some mistake, since such a defect cannot be found only by verification with the drawing, verification of such a limitation as a circuit is also necessary.

In addition, as means for checking validity of a connection order of housings, for example, if a limitation is set such that, for example, the PATH0 (loop group) always uses housings with IDs of even numbers and the PATH1 always uses housings with IDs of odd numbers, it is possible to easily verify a connection order by checking a PATH and an add number or an even number of a housing ID.

Figure 15:
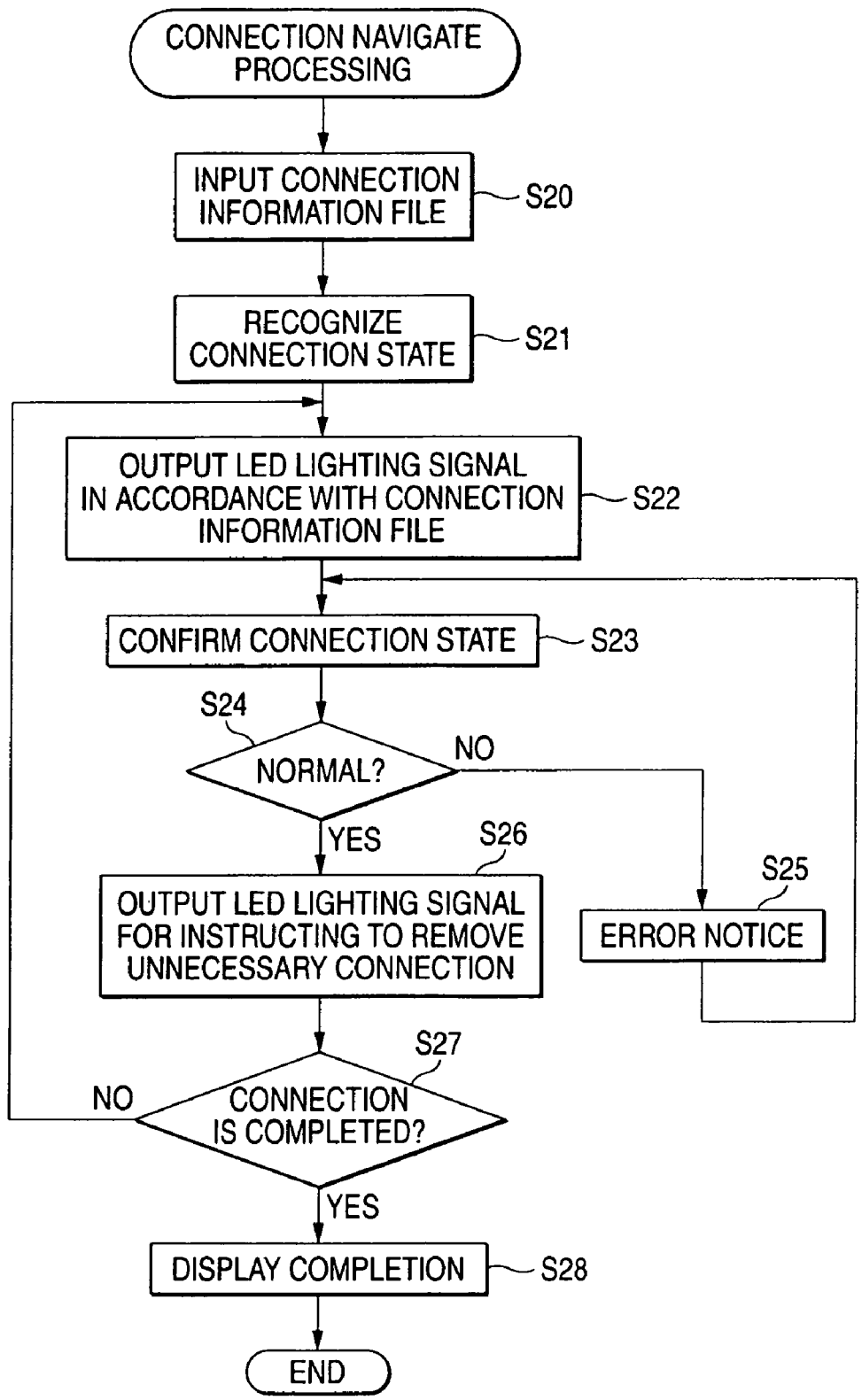
FIG. 15 is a flowchart of connection navigation processing.

(2) Connection Navigation Processing:

FIG. 15 is a flowchart of connection navigation processing. This is processing to be executed by the controller 310 of the storage device 1000 in order to support connection by lighting LEDs corresponding to connectors to which ENC cables should be connected. First, a user temporarily connects connectors of the respective disk device housings 200 and the controller housing 300 with the ENC cables in a typical pattern such as a serial pattern. Then, the user instructs the controller 310 to start this processing. The connectors are connected by the ENC cables such that a lighting control signal for the LEDs can be transmitted from the controller housing 300 to the disk device housings 200. The temporary connection may be performed, for example, using only one of the two ENC units stored in the disk device housings 200.

When this processing is started, the controller 310 inputs a connection information file from the management apparatus 10 (step S20). Then, concerning the storage device 1000, the user recognizes a typical connection state of connection which is performed as preparation for this processing (step S21). This recognition can adopt a method of, while sequentially outputting signals from the respective connectors, associating the connectors which have outputted the signals and the connectors which have received the signals. At this point, in the case in which the disk device housing 200 or the controller housing 300, which is not connected to any ENC cable, is detected, the controller 310 may perform error display. For example, the error display may use a display panel or the like of the controller housing 300 or may adopt a method of lighting the LEDs corresponding to all the connectors simultaneously.

When the recognition of the connection state is completed, the controller 310 performs navigation of connection by outputting lighting signals of the LEDs in a connection order of the ENC cables in accordance with the connection information file (step S22). For example, in the case in which the connection is based upon the connection information file shown in FIG. 14, first, the LEDs provided on the OUT side connector for Path 0 of the controller housing 300[0] (CTL #0) and the IN side connector for Path 0 of the ENC unit 202[0] (ENC 0) of the disk device housing 200 [0] (DISK #00) are lit. In the case in which temporary connection is performed solely for one ENC unit, navigation of connection may be concentrated on the other ENC unit. Consequently, connection can be performed without being prevented by the temporarily connected ENC cables.

The controller 310 confirms whether or not the connectors for which the LEDs were lit have been connected (step S23). If the connectors are not connected normally, the controller 310 performs error notification (step S25). The error notification can adopt, for example, a method of lighting or blinking the LEDs in a form different from the form at the time of navigation of connection. A specific example of the error notification will be described later.

If the connection is performed normally (step S24), some part of the connection, which the user performed as preparation, may be unnecessary. For example, in the case in which connection defined in the connection information file and connection not defined in the connection information file exist in the same housing, the latter connection is unnecessary. When such unnecessary connection is detected, the controller 310 outputs an LED lighting signal for instructing to remove the connection (step S26). The instruction for removal can adopt, for example, a method of lighting or blinking the LEDs in a form different from the form at the time of navigation of connection. A specific example will be described later. In the case in which temporary connection is performed solely for one ENC unit, at the point when connection for the other ENC unit is completed, the removal of the temporary connection may be instructed together with the removal of the connection.

The controller 310 repeatedly executes the processing of steps S22 to S26 until the entire connection defined in the connection information file is completed (step S27). When the entire connection is completed, the controller 310 performs completion display in order to inform the user of the completion of the connection (step S28) and completes the connection navigation processing. This connection navigation processing may be performed by the management apparatus 10 other than the controller 310 of the storage device. In this case, the control signals in steps S22 and S26 are outputted to the respective disk device housings 200 via the LAN and the controller 310.

Figure 16:
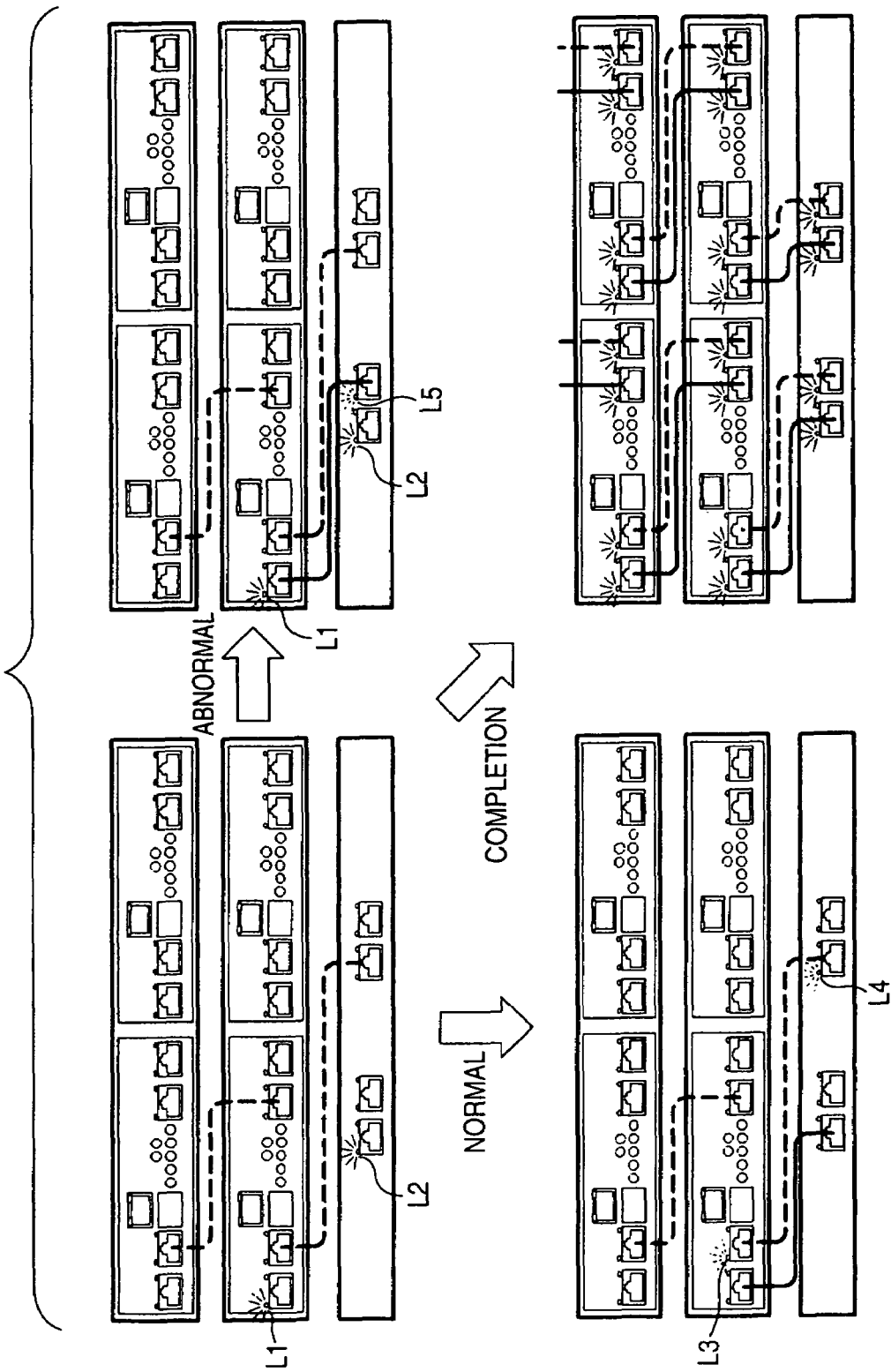
FIG. 16 is an explanatory diagram showing an example of LED lighting at the time of connection navigation.

FIG. 16 is an explanatory diagram showing an example of LED lighting at the time of connection navigation. In order to avoid complication of the figure, the example of LED lighting is shown with a state in which one controller housing is place in the bottom stage and disk device housings are stacked in two stages above the bottom stage as an example. The upper left part of the figure shows a state at a stage when the connection navigation processing is started. Broken lines represent connection which the user performed as preparation. The controller 310 lights two LEDs L1 and L2 corresponding to connectors, which should be connected, as navigation display for connection. This display corresponds to step S22 in FIG. 15.

An example of lighting of LEDs in the case in which connection is performed normally as indicated by a solid line is shown in the lower left part of the figure. With this connection, the ENC cable of the broken line, which connects the controller housing in the bottom stage and the disk device housing in the center, become unnecessary. Therefore, the controller 310 blinks two LEDs L3 and L4 corresponding to connectors, to which this cable is connected, as a removal instruction. This display corresponds to step S26 in FIG. 15. A state of lighting is changed so as to light an LED for the navigation display for connection and blink the LED for the removal instruction. Consequently, the user can recognize details of an instruction of the controller 310. In the case in which multicolor LEDs are provided, a color of lighting may be changed for the navigation display and the removal instruction.

In the upper right part of the figure, an example of lighting of LEDs in the case in which connection is performed abnormally is shown. In this example, a connector corresponding to L5 is connected rather than a connector corresponding to L2. When abnormality is detected, the controller 310 lights LEDs of L1 and L2 corresponding to connectors, which should be connected regularly, and blinks the wrong LED of L5. In this way, the user can easily recognize that the connection for L5 should be removed and L2 should be connected. This display corresponds to the error notification in step S25 in FIG. 15.

In the lower right part of the figure, an example of the completion display of connection (step S28 in FIG. 15) is shown. In this example, the controller 310 lights or blinks all the LEDs simultaneously as the completion display. The states shown in FIG. 16 are only examples. Various display forms, with which the user can easily identify connectors which should be connected, connectors which should be removed, and completion of connection, are applicable in the respective states.

The various embodiments of the invention have been described. However, it is needless to mention that the invention is not limited to these embodiments and can adopt various constitutions not departing from the scope of the invention. For example, although the connection navigation is described with four loops as an example in the embodiments, the invention is also applicable to connection with two loops or eight or more loops. In addition, although the example of application to the storage device mounted with an FC disk device is described, for example, the invention is also applicable to a storage device in which an FC disk device and an SATA disk device are mixed.

What is claimed is:

1. A disk array device comprising:
a disk array device housing;
plural disk device housings which are stored in the disk array device housing and incorporate plural disk devices; and
a controller housing which is stored in the disk army device housing and incorporates a controller for controlling reading and writing of data with respect to the disk devices,
wherein the respective disk device housings have plural connectors for connecting cables for fiber channels and plural lighting units corresponding to the respective connectors,
wherein said lighting units correspond to the connectors to which the cables to be connected between said controller housing and said disk device housings are attached such that a lighting unit corresponding to a connector of said controller housing to which a cable is connected indicates a state of connection of the cable which is connected between said connector of said controller housing and a connector of a disk device housing,
wherein the controller controls lighting states of the lighting units in accordance with a connection order of the cables between said controller housing and said plural disk device housings,
wherein a connection process is performed by setting a sequential order of blinking of said lighting units to correspond to a predetermined sequence of connecting the cables between the connectors of said controller housing and the connectors of said plural disk device housings,
wherein said connection process includes a first step of blinking a first pair of lighting units that correspond to a first connector an said controller housing and a first connector on said disk device housings and confirming that the cable connected between said first connectors is properly connected, a second step of blinking a second pair of lighting units that correspond to a second connector on said controller housing and a second connector on said disk device housings and confirming that the cable connected between said second connectors is properly connected, and a Third step of repeating said first and second steps until completion of said predetermined sequence, and
wherein data sent from said controller to a disk device in one of said plural disk device housings is transferred to said one of said plural disk device housings via The others of said plural disk device housings,
wherein in order to perform said connection process in said disk array device, a user creates a connection information file using a management tool,
wherein said connection information file is information required by said controller, when performing said connection process, that defines a connection method to be implemented between respective ones of said disk device housings and said controller housing, and
wherein said connection information file is created by performing steps including:
receiving, by said management tool, information input by said user including the number of the disk device housings and information about a Redundant Array of Independent Disks (RAID) configuration of the disk array device, and
creating said connection information file based on said information input by said user.

2. A disk array device according to claim 1, wherein the respective lighting units are provided in a fixed relative positional relation with respect to the respect connectors.

3. A disk array device according to claim 1, wherein the controller housing and the plural disk device housings are connected to a LAN cable, respectively, and
wherein the controller performs control of the lighting units via the LAN cable.

4. A disk array device according to claim 1, wherein the controller performs control of the lighting units via the cables which have already been connected.

5. A disk array device according to claim 1, wherein the controller reads a connection information file defining the connection order from a predetermined external apparatus and performs the control on the basis of the connection information file.

6. A disk array device according to claim 1, wherein the controller is capable of detecting abnormality of a connection state of connectors which are connected in accordance with the connection order.

7. A disk array device according to claim 1, wherein the controller is provided in a plural form, the respective connectors are associated to be connected to any one of the controllers, and
wherein the respective controllers perform control of the lighting state individually.

8. A connection support method for, in a disk array device storing a controller housing and plural disk device housings in a disk array device housing, connecting connectors, which extend over the plural disk device housings, with cables for fiber channels, the controller housing incorporating a controller for controlling reading and writing with respect to the disk devices, the respective disk device housings having plural connectors for connecting the cables and plural lighting units corresponding to the respective connectors, the connection support method comprising, as steps to be executed by the controller:
a step of recognizing the plural disk device housings stored in the disk array device housing,
wherein said lighting units correspond to the connectors to which the cables to be connected between said controller housing and said disk device housings are attached such that a lighting unit corresponding to a connector of said controller housing to which a cable is connected indicates a state of connection of The cable which is connected between said connector of said controller housing and a connector of a disk device housing; and
a lighting control step of controlling lighting states of the lighting units in accordance with a connection order of the cables among said controller housing and said plural disk device housings based on a result of the recognition such that the disk device housings are connected in a connection state defined in advance,
wherein a connection process is performed by setting a sequential order of blinking of said lighting units to correspond to a predetermined sequence of connecting the cables between the connectors of said controller housing and the connectors of said plural disk device housings,
wherein said connection process includes a first step of blinking a first pair of lighting units that correspond to a first connector on said controller housing and a first connector on said disk device housings and confirming that the cable connected between said first connectors is properly connected, a second step of blinking a second pair of lighting units That correspond to a second connector on said controller housing and a second connector on said disk device housings and confirming that the cable connected between said second connectors is properly connected, and a third step of repeating said first and second steps until completion of said predetermined sequence, and wherein data sent from said controller to a disk device in one of said plural disk device housings is transferred to said one of said plural disk device housings via the others of said plural disk device housings, wherein in order to perform said connection process in said disk array device, a user creates a connection information file using a management tool, wherein said connection information file is information required by said controller, when performing said connection process, that defines a connection method to be implemented between respective ones of said disk device housings and said controller housing, and wherein said connection information file is created by per-forming steps including:

receiving, by said management tool, information input by said user including the number of the disk device housings and information about a Redundant Array of independent Disks (RAID) configuration of the disk array device, and creating said connection information file based on said information input by said user.

9. A connection support method for disk array devices according to claim 8, wherein the respective lighting units are provided in a fixed relative positional relation with respect to the respect connectors.

10. A connection support method for disk array devices according to claim 8, wherein the controller housing and the plural disk device housings are connected to a LAN cable, respectively, and
wherein the controller performs control of the lighting units via the LAN cable.

11. A connection support method for disk array devices according to claim 8, wherein the controller performs control of the lighting units via the cables which have already been connected.

12. A connection support method for disk array devices according to claim 8, wherein the controller reads a connection information file defining the connection order from a predetermined external apparatus and performs the control based on the connection information file.

13. A connection support method for disk array devices according to claim 8, further comprising a step in which the controller detects abnormality of a connection state of connectors which are connected in accordance with the connection order.

14. A disk array device comprising:
plural controller housings each including:
a communication control unit which is connected to a host apparatus and receives data from the host apparatus,
a cache memory which is connected to the communication control unit and saves data exchanged between the communication control unit and the host apparatus, and
plural controllers which are connected to the host apparatus and the cache memory and perform control such that the data, which is exchanged between the communication control unit and the host apparatus, is transferred to the communication control unit or received from the communication control unit;
plural first disk drive housings each including:
plural disk drives which are connected to a first controller housing among the plural controller housings with a first fiber channel loop and store data to be transferred by the plural controllers in the first controller housing,
first connectors to which the first fiber channel loop is connected, and
first display devices which are provided in association with the first connectors; and plural second disk drive housings each including:
plural disk drives which are connected to a second controller housing among the plural controller housings with a second fiber channel loop and store data to be transferred by the plural controllers in the second controller housing,
second connectors to which the second fiber channel loop is connected, and
second display devices which are provided in association with the
second connectors,
wherein the plural controller housings, the plural first disk drive housings, and the plural second disk drive housings are arranged in an identical disk array device housing,
wherein the plural first disk drive housings and the plural second disk drive housings are arranged alternately in the identical disk array device housing,
wherein the plural controllers in the first controller housing perform control, in the case in which the first fiber channel loop is connected to the plural first disk drive housings, so as to light the first display devices of the plural first disk drive housings in an order among the first controller housing and the plural first disk drive housings in which the first fiber channel loop should be connected to the first connectors of the plural first disk drive housings,
wherein data sent from the plural controllers to a disk device in one of said plural first disk drive housings is transferred to said one of said plural first disk drive housings via the others of said plural first disk drive housings,
wherein the plural controllers in the second controller housing perform control, in the case in which the second fiber channel loop is connected to the plural second disk drive housings, so as to light the second display devices of the plural second disk drive housings in an order among the second controller housing and the plural second disk drive housings in which the second fiber channel loop should be connected to the second connectors of the plural second disk drive housings, and
wherein data sent from the plural controllers to a disk device in one of said plural second disk drive housings is transferred to said one of said plural second disk drive housings via the others of said plural second disk drive housings,
wherein in order to perform said control by the plural controllers of each of said first or second controllers in said disk array device, a user creates a connection information file using a management tool,
wherein said connection information file is information required by said controller, when performing said connection process, that defines a connection method to be implemented between said disk device housings and said first and second controller housings, and
wherein said connection information file is created by performing steps including:
receiving, by said management tool, information input by said user including the number of the disk device housings and information about a Redundant Array of independent Disks (RAID) configuration of the disk array device, and
creating said connection information file based on said information input by said user.

* * * * *